C. H. MENEELY.
Improvement in Bell-Yoke Attachments.
No. 114,585. Patented May 9, 1871.
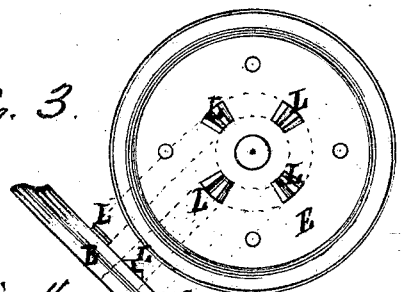
Fig. 3.
Fig. 4.
Fig. 2.
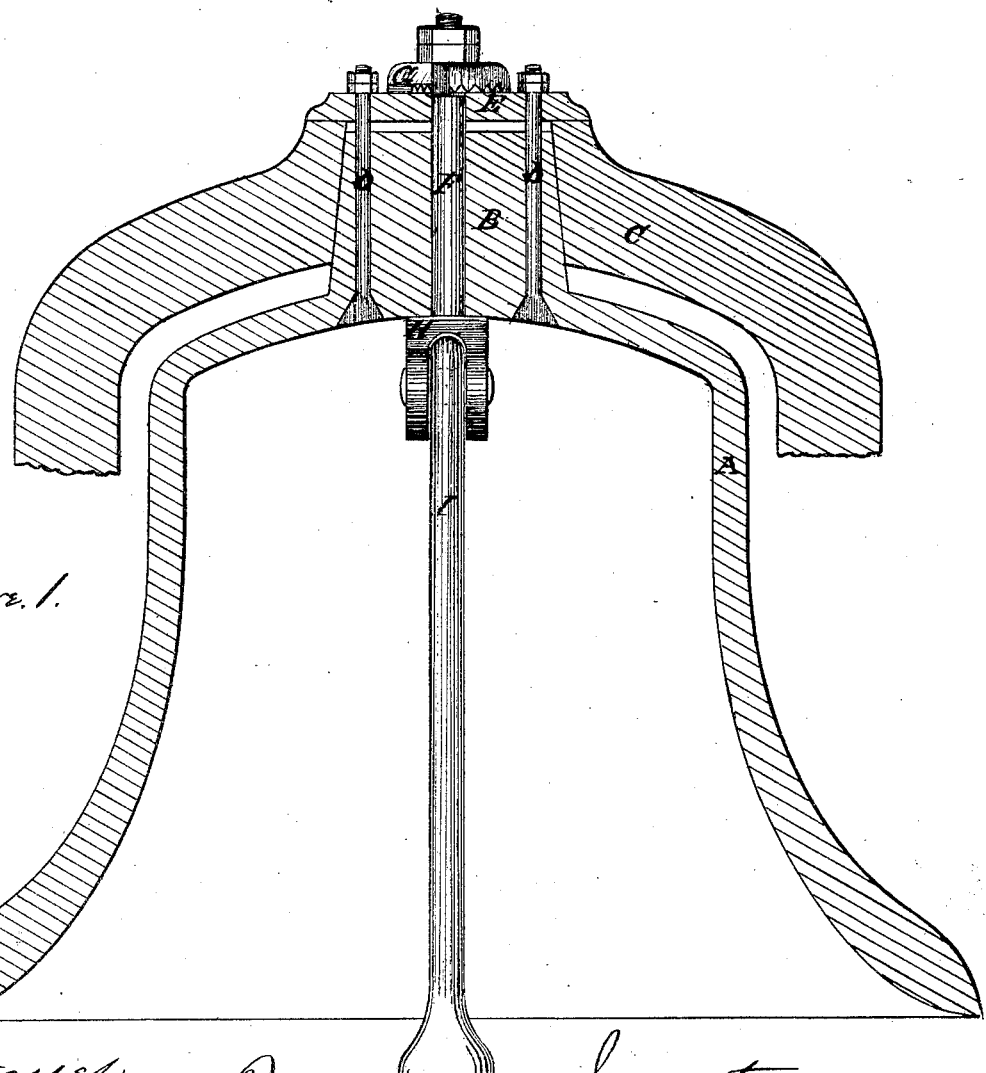
Figure. 1.
Witnesses
John Paterson
R. M. Corbin
Inventor
Clinton H. Meneely

United States Patent Office.

CLINTON H. MENEELY, OF TROY, NEW YORK.

Letters Patent No. 114,585, dated May 9, 1871.

IMPROVEMENT IN BELL-YOKE ATTACHMENTS.

The Schedule referred to in these Letters Patent and making part of the same.

I, CLINTON H. MENEELY, of Troy, in the county of Rensselaer and State of New York, have invented certain Improvements in Bell-Yoke Attachments, of which the following is a specification.

Nature and Objects of the Invention.

My invention relates to a washer, toothed around on its lower side, and bearing upon the top of the crown-plate of the yoke, in combination with two or more corresponding teeth projecting at various points from the top of the crown-plate; the object of this part of my invention being to secure, in a very simple and effectual manner, the clapper in its proper position with reference to the swinging of the bell under all circumstances, as well as to provide a ready method of changing the relative position of the bell and clapper, as a tendency to fracture by continued use or other cause might require.

Description of the Accompanying Drawing.

Figure 1 is a sectional view of a bell and yoke embodying my invention.

Figure 2 is a plan showing a view of the toothed under side of the washer set upon the yoke crown-cap.

Figures 3 and 4 are views of the yoke crown-cap, upon which are teeth corresponding to those of the washer, and through which are holes to admit of the passage of the bolts attaching the yoke and the bell, and by means of which the bell is sustained.

General Description.

A is the body of the bell.

B is the shank projecting from the crown of the bell, upon which the yoke-body C rests.

D D are bolts with heads set in recesses on the under side of the crown of the bell, passing up through the shank B and through the yoke crown-plate E, with nuts fastening down upon this plate.

The bolts D D are attached to the body of the bell in the manner shown, so as to secure strength and permanency in the fastening. They have their heads recessed or countersunk into the crown of the bell, so as to present no obstruction to the movements of the inner parts, as required.

F is the center bolt, made square below the screw, passing up through the shank B, the crown-plate E, and washer G.

This bolt has its head fastened into the clevis H of the clapper I.

The washer G has teeth K K upon its lower side fitting into corresponding teeth L L on the top of the crown-plate E.

By means of this combination the clapper I, which is sustained by the center bolt F fastened down upon the washer G, through which it passes in the square hole M, is very simply and firmly secured in its proper position against all possible straining.

This simple combination further admits of a ready change in the relative position of the bell and clapper, as a tendency to fracture, by continued use or other cause, might suggest.

I am well aware that bells have been secured in the same way to the crown-plate, and that the same general combination for rotating is used, consisting of a toothed lug forced up against the lateral teeth on the washer; but these devices I do not now claim; but

What I claim is—

The combination of the shank, secured as shown to the crown-plate, the washer, toothed upon its under side and meshing into teeth upon the crown-plate, the center bolt and its nut, all as and for the purpose described.

CLINTON H. MENEELY.

Witnesses:
GEO. H. KIMBERLY,
ED. CALDWELL.